(12) United States Patent
Jang et al.

(10) Patent No.: US 9,244,320 B2
(45) Date of Patent: Jan. 26, 2016

(54) LIQUID CRYSTAL DISPLAY AND MANUFACTURING METHOD THEREOF

(71) Applicant: Samsung Display Co., Ltd., Yongin, Gyeonggi-do (KR)

(72) Inventors: Dae Hwan Jang, Gwangmyeong-si (KR); Sang Ho Park, Suwon-si (KR); Dong Jo Kim, Yongin-si (KR); Jung Gun Nam, Seoul (KR); Dae-Young Lee, Suwon-si (KR); Gug Rae Jo, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 189 days.

(21) Appl. No.: 13/840,832

(22) Filed: Mar. 15, 2013

(65) Prior Publication Data
US 2014/0118656 A1    May 1, 2014

(30) Foreign Application Priority Data
Oct. 29, 2012 (KR) .................. 10-2012-0120436

(51) Int. Cl.
*G02F 1/136* (2006.01)
*G02F 1/1335* (2006.01)
*G02F 1/1362* (2006.01)

(52) U.S. Cl.
CPC .... *G02F 1/136209* (2013.01); *G02F 1/133528* (2013.01); *G02F 1/133611* (2013.01); *G02F 2001/133548* (2013.01)

(58) Field of Classification Search
CPC .................. G02F 1/136209; G02F 1/133528
USPC ................................. 349/44, 96–98
See application file for complete search history.

(56) References Cited

U.S. PATENT DOCUMENTS

| | | | |
|---|---|---|---|
| 5,724,107 A * | 3/1998 | Nishikawa et al. | 349/38 |
| 6,288,840 B1 | 9/2001 | Perkins et al. | |
| 6,297,862 B1 * | 10/2001 | Murade | 349/44 |
| 7,508,123 B2 | 3/2009 | Lee et al. | |
| 7,659,039 B2 | 2/2010 | Ito et al. | |
| 7,965,357 B2 | 6/2011 | Van De Witte et al. | |
| 8,081,273 B2 | 12/2011 | Choo et al. | |
| 2007/0076143 A1 | 4/2007 | Palk et al. | |
| 2011/0222002 A1 * | 9/2011 | Lee | 349/96 |
| 2011/0299001 A1 * | 12/2011 | Banin et al. | 349/33 |
| 2011/0304785 A1 | 12/2011 | Ge et al. | |
| 2012/0140148 A1 | 6/2012 | Kadowaki | |

FOREIGN PATENT DOCUMENTS

| | | |
|---|---|---|
| JP | 11-183727 | 7/1999 |
| JP | 2004-077771 | 3/2004 |

(Continued)

*Primary Examiner* — Dung Nguyen
(74) *Attorney, Agent, or Firm* — F. Chau & Associates, LLC

(57) ABSTRACT

A liquid crystal display includes a transparent insulation substrate, a first polarizer, and a semiconductor layer, a thin film transistor, and a backlight unit. The first polarizer is disposed on the transparent insulation substrate. The first polarizer includes a light blocking film and metal wires. The semiconductor layer, disposed on the light blocking film, has a perimeter aligned with a perimeter of the light blocking film. The thin film transistor, disposed on the semiconductor layer, includes a source region and a drain region disposed in the semiconductor layer. The backlight unit, disposed under the transparent insulation substrate, provides light to the transparent insulation substrate. The blocking film reflects substantially all of the light. Gaps are disposed between the metal wires.

12 Claims, 7 Drawing Sheets

(56) References Cited

FOREIGN PATENT DOCUMENTS

| JP | 2009-198638 | 9/2009 |
| KR | 1020070105092 | 10/2007 |
| KR | 1020080004880 | 1/2008 |
| KR | 1020080037324 | 4/2008 |
| KR | 10-0863570 | 10/2008 |
| KR | 1020090046398 | 5/2009 |

* cited by examiner

LIQUID CRYSTAL DISPLAY AND MANUFACTURING METHOD THEREOF

CROSS-REFERENCE TO RELATED APPLICATION

This application claims priority under 35 U.S.C. §119 to Korean Patent Application No. 10-2012-0120436, filed on Oct. 29, 2012, in the Korean Intellectual Property Office, the disclosure of which is incorporated by reference herein in its entirety.

TECHNICAL FIELD

The present invention relates to a liquid crystal display and a manufacturing method thereof.

DESCRIPTION OF RELATED ART

Liquid Crystal Displays (LCDs) are flat panel displays for displaying images using light originated from the backlight units of LCDs. In general, about 50% of such light is wasted because a polarizer of the LCDs absorbs or reflects the light. As a result, only about 50% of the light generated contributes to the display. Such absorption or reflection causes a decrease in light efficiency and as a result, lowers luminance of LCDs.

SUMMARY

According to an exemplary embodiment of the invention, a liquid crystal display includes a transparent insulation substrate, a first polarizer, and a semiconductor layer, a thin film transistor, and a backlight unit. The first polarizer is disposed on the transparent insulation substrate. The first polarizer includes a light blocking film and metal wires. The semiconductor layer, disposed on the light blocking film, includes a perimeter aligned with a perimeter of the light blocking film. The thin film transistor, disposed on the semiconductor layer, includes a source region and a drain region disposed in the semiconductor layer. The backlight unit, disposed under the transparent insulation substrate, illuminates light to the transparent insulation substrate. The blocking film reflects substantially all of the light. Gaps disposed between the metal wires transmit part of the light.

According to an exemplary embodiment of the invention, a liquid crystal display is manufactured by forming a metal layer on a transparent insulation substrate. A plurality of metal wires and a light blocking film are formed by patterning the metal layer. A semiconductor layer is formed on the light blocking film. A perimeter of the semiconductor layer is aligned with that of the light blocking film. A thin film transistor is formed on the semiconductor layer.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF THE EXEMPLARY EMBODIMENTS

Figure 1:
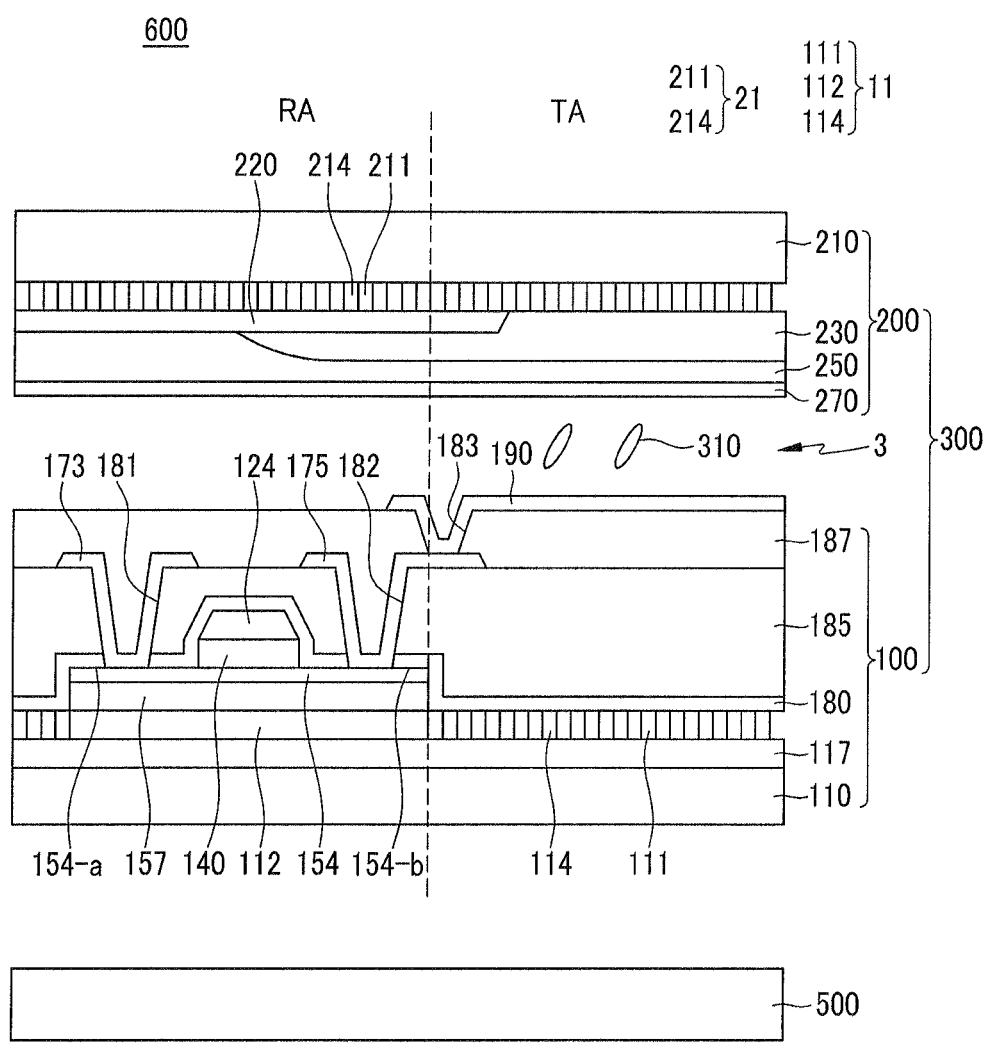
FIG. 1 is a cross-sectional view of a liquid crystal display according to an exemplary embodiment of the present invention.

Exemplary embodiments of the inventive concept will be described below in more detail with reference to the accompanying drawings. However, the inventive concept may be embodied in different forms and should not be construed as limited to the embodiments set forth herein. Rather, these exemplary embodiments are provided so that this disclosure will be thorough and complete and will fully convey the inventive concept to those skilled in the art. In the drawings, the thickness of layers and regions may be exaggerated for clarity. Like reference numerals may refer to the like elements throughout the specification and drawings.

Hereinafter, a liquid crystal display according to an exemplary embodiment of the present invention will be described in detail with reference to FIG. 1.

FIG. 1 is a cross-sectional view of a liquid crystal display according to an exemplary embodiment of the present invention.

A liquid crystal display 600 according to an exemplary embodiment of the present invention includes a backlight unit 500 and a liquid crystal panel 300. The backlight unit 500 may include a light source (not shown), a light guide (not shown), a reflector (not shown), and an optical sheet (not shown). Light provided by the light source is provided to an upper liquid crystal panel through the light guide, the reflector and the optical sheet. According to an exemplary embodiment, the optical sheet may include a luminance enhancement film which includes two layers having different refractive indexes that are laminated. Alternatively, the optical sheet need not include a luminance enhancement film.

The liquid crystal panel 300 may include a liquid crystal layer 3, a lower panel 100, and an upper panel 200 as illustrated in FIG. 1.

The lower panel 100 may include a lower insulation substrate 110, a first buffer layer 117, a lower polarizer 11, and an interlayer buffer layer 157.

The first buffer layer 117 is formed on a lower insulation substrate 110 which includes a transparent glass, and/or a plastic panel. The first buffer layer 117 may include an insulating material such as silicon oxide (SiOx) or silicon nitride (SiNx).

The lower polarizer 11 is formed on the first buffer layer 117.

The lower polarizer 11 is a reflective polarizer. The lower polarizer 11 includes metal wires 111, gaps 114, and a light blocking film 112. The metal wires 111 and gaps 114 are positioned in a transmissive area (TA) which transmits light from the backlight unit 500. A reflective area (RA) reflects substantially all light from the backlight unit 500.

The metal wires 111, formed in the transmissive area (TA), extend in a direction perpendicular to the cross-sectional view of FIG. 1 and are spaced apart from each other at a predetermined distance. A gap 114 may be positioned between two adjacent metal wires of the metal wires 111. The gap 114 may include a width smaller than a wavelength of the light that the backlight unit 500 provides. For example, the gap may have a width of several tens to hundreds of nm. The metal wires 111 may have various widths. For example, the metal wires 111 have a width substantially similar to that of the gap 114 between the metal wires 111. A thickness of the metal wires 111 may vary depending on a material of the metal wires 111 ranging from several tens to hundreds of nm. For example, a thickness of the metal wires 111 may have a value at least 2.5 times a width of the metal wires 111. When the metal wires 111 have a width of about 60 nm, a thickness thereof may be about 150 nm, and a width of gap 114 between the metal wires 111 may be about 60 nm. Accordingly, when the plurality of metal wires 111 is extended in a direction perpendicular to the cross-sectional view of FIG. 1, light vertical to the cross-sectional view of FIG. 1 may be transmitted while light parallel thereto may be reflected.

The gaps 114 are positioned between two adjacent metal wires 111 and the gaps 114 may be filled with air. Alternatively, the gaps 114 between metal wires 111 may be filled with a material having a refractive index similar to that of air.

The light blocking film 112 formed in the reflective area (RA) may include a substantially same material as that of the metal wires 111. The light blocking film serves to reflect substantially all light from the backlight unit 500. An upper surface of the light blocking film 112 is substantially level with that of the metal wires 111. For example, the light blocking film 112 and the plurality of metal wires 111 may include Al, Au, Ag, Cu, Cr, Fe, and/or Ni. The light blocking film 112 may have a substantially same height as that of the metal wires 111. The light blocking film 112, formed in the reflective area (RA), includes a perimeter aligned with that of a semiconductor layer 154 formed in the lower panel 100. According to an exemplary embodiment, the light blocking film 112, in the reflective area (RA), may be disposed under the light blocking member 220. Alternatively, the metal wires 111 and the light blocking film 112 may be formed of different metals.

An interlayer buffer layer 157 is formed on the light blocking film 112 of the lower polarizer 11. The light blocking film 112 may be overlapped substantially completely with the interlayer buffer layer 157. The interlayer buffer layer 157 may include an insulating material such as silicon oxide (SiOx) or silicon nitride (SiNx).

The semiconductor layer 154 is positioned on the interlayer buffer layer 157. For example, the semiconductor layer 154 may be overlapped substantially completely with the interlayer buffer layer 157 and the light blocking film 112. The semiconductor layer 154 may include various semiconductor materials such as amorphous silicon, poly-crystalline silicon, single crystalline silicon, and semiconductor oxides. The semiconductor layer 154 may also include a group II element or a group VI element along with silicon (Si). The semiconductor layer 154 may include a source region 154-$a$, a drain region 154-$b$, and a channel region (not shown). The channel region may be positioned between the source region 154-$a$ and the drain region 154-$b$.

The interlayer buffer layer 157 serves to prevent the semiconductor layer 154 from being in contact with the light blocking film 112 of the lower polarizer 11 formed of a conductive material.

According to an exemplary embodiment, the light blocking film 112 may include an area greater than that of the semiconductor layer 154. In such a case, the semiconductor layer 154 may be positioned within a perimeter of the light blocking film 112, thereby preventing light from the backlight unit 500 from being incident on the semiconductor layer 154.

A gate insulating layer 140 covering some region of the semiconductor layer 154 is formed on the semiconductor layer 154. The gate insulating layer 140 may include an insulating material such as silicon oxide (SiOx) and/or silicon nitride (SiNx).

A gate electrode 124 is formed on the gate insulating layer 140. The gate electrode 124 is disposed on the semiconductor layer 154 with the gate insulating layer 140 interposed therebetween. A boundary of the gate electrode 124 may be aligned with that of the gate insulating layer 140. A channel region (not shown), positioned in the semiconductor layer 154, may be positioned under the gate insulating layer 140 and gate electrode 124. The gate electrode 124 is connected with a gate line (not shown) to receive gate voltage.

A first passivation layer 180 is formed on the metal wires 111, the interlayer buffer layer 157, the semiconductor layer 154, the gate insulating layer 140, and the gate electrode 124. The first passivation layer 180 may include an inorganic insulating material.

A second passivation layer 185 is formed on the first passivation layer 180. The second passivation layer 185 may include an organic insulating material.

Contact holes 181 and 182 are formed in the first passivation layer 180 and the second passivation layer 185 and respectively expose the source region 154-$a$ and the drain region 154-$b$ of the semiconductor layer 154.

A source electrode 173 and a drain electrode 175 are formed on the second passivation layer 185. The source electrode 173 is connected with the source region 154-$a$ of the semiconductor layer 154 through the first contact hole 181. The drain electrode 175 is connected with the drain region 154-$b$ of the semiconductor layer 154 through the second contact hole 182. The source electrode 173 is connected with a data line (not shown) to receive data voltage.

According to an exemplary embodiment, either the first passivation layer 180 or the second passivation layer 185 may be omitted.

A third passivation layer 187 is formed on the second passivation layer 185, the source electrode 173, and the drain electrode 175. The third passivation layer 187 may include an inorganic insulating material or an organic insulating material.

The third passivation layer 187 has a third contact hole 183 exposing a part of the drain electrode 175.

A pixel electrode 190 is formed on the third passivation layer 187. The pixel electrode 190 includes a transparent conductor such as ITO (indium tin oxide), and/or IZO (indium zinc oxide). The pixel electrode 190 is formed in a region corresponding to the transmissive area (TA) of the lower polarizer 11. The pixel electrode 190 is connected to the drain electrode 175 through the third contact hole 183.

A thin film transistor illustrated in FIG. 1 may have a structure formed by a self align method. The thin film transistor includes the gate electrode 124, the source electrode 173, and the drain electrode 175. The thin film transistor also includes the source region 154-$a$ and the drain region 154-$b$ disposed in the semiconductor layer 154. The source region 154-$a$ is connected to the source electrode 173, and the drain region 154-$b$ is connected to the drain electrode 175. The thin film transistor, in response to a control signal applied to the gate, outputs data voltage of the source electrode 173 to the drain electrode. Voltage output to the drain electrode 175 is transmitted to the pixel electrode 190. The voltage applied between the pixel electrode 190 and the common electrode 270 generates an electric field along with the common electrode 270 of the upper panel 200, changing an alignment direction of liquid crystal molecules 310.

An alignment layer (not shown) may be formed on the pixel electrode 190.

According to an exemplary embodiment, a lower polarizer 11 includes an in cell type polarizer formed on the lower insulation substrate 110.

Hereinafter, an upper panel 200 will be described.

An upper polarizer 21 is formed under an upper insulation substrate including a transparent glass, and/or a plastic plate.

The upper polarizer 21 is a reflective polarizer and includes metal wires 211. The metal wires 211 extend in a direction perpendicular to the cross-sectional view and are spaced apart from each other at a predetermined distance. A gap 214 is positioned between two adjacent metal wires of the metal wires 211. The gap 214 is smaller than a wavelength of light from the backlight unit 500 and has a width of several tens to hundreds nm. The metal wires 211 may have various widths. For example, the metal wires 211 have a width substantially similar to the gap 214 between metal wires 211. A thickness of the metal wires 211 may vary depending on a material of the metal wires 211, and may have a width of several tens to hundreds of nm. For example, the thickness of the metal wires 211 has a value three times more than a width of the metal wires 211. Accordingly, when metal wires 211 extend in a direction perpendicular to the cross-sectional view, light vertical to the cross-sectional view may be transmitted while light parallel to the cross-sectional view may be reflected.

According to an exemplary embodiment, the upper polarizer 21 may have a light blocking film substantially similar to that of the lower polarizer 11. Further, the upper polarizer 21 may include an absorptive polarizer including a TAC (Tri-Acetyl-Cellulose) layer and/or a PVA (polyvinyl alcohol) layer.

In an exemplary embodiment as shown in FIG. 1, the upper polarizer 21 is formed as an on cell type positioned on the upper insulation substrate 210. In this case, the upper polarizer 21 may further include a layer covering the metal wires 211 and the gap 214 thereof. Alternatively, the upper polarizer 21 of FIG. 1 may be formed as an in cell type disposed under the upper insulation substrate 210.

A light blocking member 220, a color filter 230, and a common electrode 270 are formed under the upper polarizer 21 of the upper panel 200 according to an exemplary embodiment. Alternatively, at least one or all of the light blocking member 220, the color filter 230, and the common electrode 270 may be positioned in the lower panel 100. A structure under the upper insulation substrate 210 of the upper panel 200 in FIG. 1 will be described as follows.

The light blocking member 220 is formed under the upper insulation substrate 210. The light blocking member 220 is called a black matrix. The black matrix prevents light leakage. The light blocking member 220 faces a pixel electrode 190 and is formed in a part corresponding to a gate line (not shown) and a data line (not shown) and in a part corresponding to a thin film transistor, thus preventing light leakage between the pixel electrodes 190. The light blocking member 220 is positioned in the reflective area (RA), encroaching on a part of transmissive area (TA) where light from the backlight unit 500 is transmitted. The encroaching portion of the light blocking member 220 may overlap with the pixel electrode 190.

A color filter 230 is formed under the upper polarizer 21 and the light blocking member 220. The color filter 230 covers the opening of the light blocking member 220 and may extend in a vertical direction. The color filter 230 may display one primary color such as red, green or blue.

An overcoat 250 is formed under the color filter 230 and the light blocking member 220. The overcoat 250 may include an insulating material, for example an organic insulating material, having a flat surface, preventing the color filter 230 from being exposed. Alternatively, the overcoat 250 may be omitted.

The common electrode 270 is formed under the overcoat 250. The common electrode 270 includes a transparent conductor such as ITO (indium tin oxide), and/or IZO (indium zinc oxide).

An alignment layer (not shown) may be formed under the common electrode 270.

A liquid crystal layer 3 is formed between the upper panel 200 and the lower panel 100.

The liquid crystal layer 3 includes a liquid crystal molecule 310 having a dielectric anisotropy. The liquid crystal molecule 310 may have a long axis which is vertical or horizontal to the surfaces of two display panels 100 and 200 in a state that no electric field is applied. An alignment direction of the liquid crystal molecule 310 is changed by a vertical electric field generated by the pixel electrode 190 and the common electrode 270. For example, the pixel electrode 190 is physically and electrically connected with the drain electrode 175, receives data voltage from the drain electrode 175, and generates an electric field along with the common electrode 270 that receives a common voltage, thereby determining a direction of the liquid crystal molecules 310 of the liquid crystal layer 3 between two electrodes 190 and 270. Accordingly, polarization of light passing through the liquid crystal layer 3 varies according to a direction of liquid crystal molecules as determined above. The pixel electrode 190 and the common electrode 270 constitute a capacitor (hereinafter, referred to as "liquid crystal capacitor") to maintain the applied voltage even after the thin film transistor is turned off.

According to an exemplary embodiment, the common electrode 270 is formed in the upper panel 200. Alternatively, the common electrode 270 may be formed in the lower panel 100 and may be formed in the same material layer as that of the pixel electrode 190. Alternatively, the common electrode 270 may be formed over or below the pixel electrode 190. At this time, the liquid crystal molecule 310 formed in the liquid crystal layer 3 has a long axis which is horizontal to the surfaces of two display panels 100 and 200 in a state that no electric field is applied, and may rotate within a horizontal surface by the horizontal electric field generated by the pixel electrode 190 and the common electrode 270.

Hereinafter, reflective and transmissive characteristics of light provided by a backlight unit 500 will be described.

Figure 2:
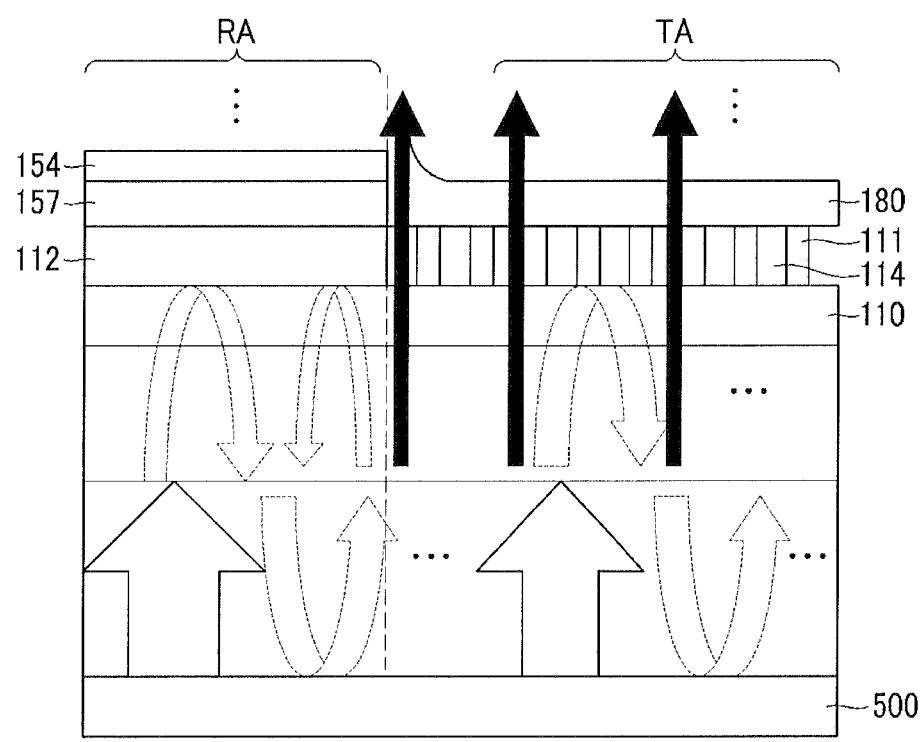
FIG. 2 is a diagram illustrating light reflected from or transmitted through a polarizer according to an exemplary embodiment of the present invention.

In FIG. 2, the blocking film 112 of the lower polarizer 11 reflects substantially all of light originated from the backlight unit 500. The reflected light from the blocking film 112 is reflected again by a reflective sheet (not shown) of the backlight unit 500 and the reflected light re-enters into the gaps 114 of the lower polarizer 11. The light which passes through the transmissive area (TA) becomes a polarized light. According to an exemplary embodiment, the lower polarizer 11 increases light efficiency by recycling the light reflected from the light blocking film 112.

In the transmissive area (TA), light having a polarization axis parallel to the cross-sectional view of FIG. 2 is reflected. The reflected light from the transmissive area (TA) is reflected from the reflective sheet (not shown) of the backlight unit 500 into the transmissive area (TA) of the lower polarizer 11. According to an exemplary embodiment, the lower polarizer 11 increases light efficiency by recycling the light reflected from the transmissive are (TA).

As illustrated in FIG. 2, the lower polarizer 11 recycles light reflected away from the lower polarizer 11 and as a result, increases light efficiency.

Hereinafter, a manufacturing method of a lower panel 100 will be described according to an exemplary embodiment of the present invention through FIGS. 3 to 11.

FIGS. 3 to 11 are cross-sectional views sequentially illustrating a method of manufacturing a lower panel according to an exemplary embodiment of the present invention.

Figure 3:
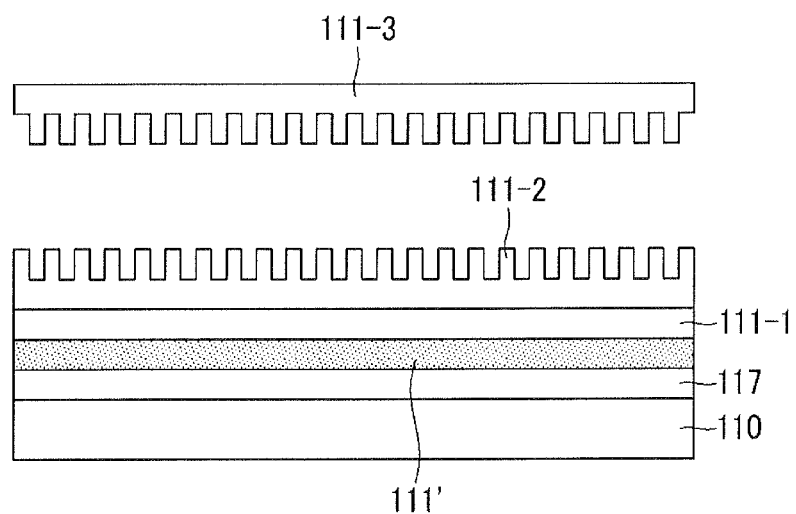
FIGS. 3 to 11 are cross-sectional views illustrating a method of manufacturing a lower panel according to an exemplary embodiment of the present invention.

As illustrated in FIG. 3, a first buffer layer 117 is laminated on a transparent insulation substrate 110. The first buffer layer 117 may include silicon oxide or silicon nitride. A metal layer 111' is laminated on the first buffer layer 117. When it is patterned according to process steps that will be explained below, the metal layer 111' is patterned and becomes metal wires 111 and a light blocking film 112. The metal layer 111' may include Al, Au, Ag, Cu, Cr, Fe, and/or Ni. Next, a hard mask layer 111-1 is laminated on the metal layer 111'. Then, a resin 111-2 is laminated on the hard mask layer 111-1. A mold 111-3 is applied to the resin 111-2 to form a linear pattern in the resin 111-2. The linear pattern will serve to pattern the hard mask layer 111-1. The linear pattern of the resin 111-2 includes a periodic array of lines that are spaced apart at a predetermined distance smaller than a wavelength of visible light. The linear pattern of the mold 111-3 is formed by an engraving method. According to an exemplary embodiment of the present invention, the mold 111-3 may include the linear pattern arranged in all regions regardless of the transmissive area (TA) and the reflective area (RA). As a result, the mold 111-3 may form an inverted pattern in all regions of the resin 111-2 regardless of the transmissive area (TA) and the reflective area (RA).

Figure 4:
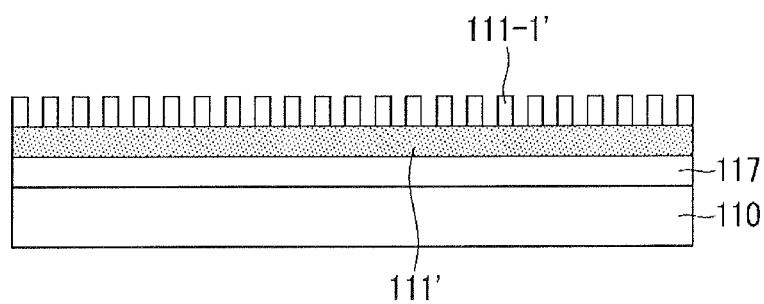

In FIG. 4, it is shown that a hard mask pattern 111-1' is formed using the pattern of the resin 111-2 as a etch mask. The pattern of the resin 111-2 is transferred on the hard mask layer 111-1 to form the hard mask pattern 111-1'. Alternatively, the hard mask pattern 111-1' may be formed by an embossing method.

Figure 5:
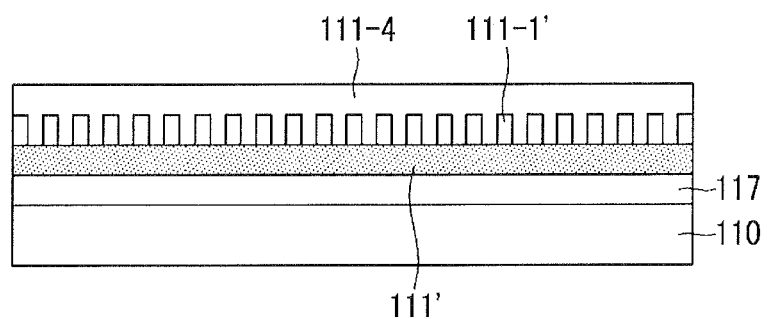

In FIG. 5, a photo resist 111-4 is laminated on a structure resulted from the manufacturing step of FIG. 4. The photo resist 111-4 is laminated on the metal layer 111' and the hard mask pattern 111-1'.

Figure 6:
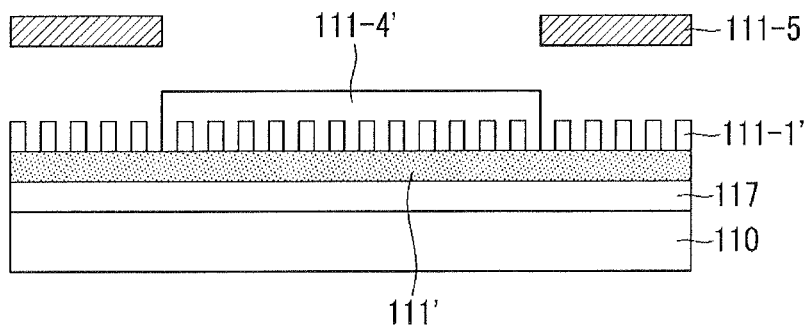

In FIG. 6, the photo resist 111-4 is patterned so that a photo resist pattern 111-4' remains on the reflective area (RA). The photo resist 111-4 is exposed by the mask 111-5, and then the exposed photo resist 111-4 is developed to form the photo resist pattern 111-4'. Then, the photo resist 111-4 formed in the transmissive area (TA) is removed, and the photo resist 111-4 formed in the reflective area (RA) becomes the photoresist pattern 111-4'. As a result, a perimeter of the photo resist pattern 111-4' remaining after development may be aligned with a part of the metal layer 111' which will be a light blocking film 112.

Figure 7:
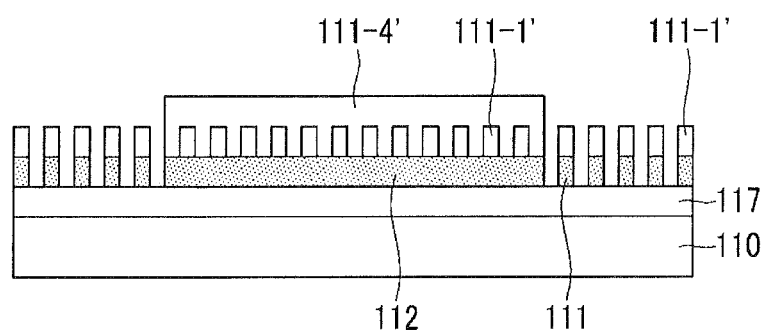

In FIG. 7, the metal layer 111' is etched to form metal wires 111 using the photo resist pattern 111-4' and the hard mask pattern 111-1' as a etch mask.

Figure 8:
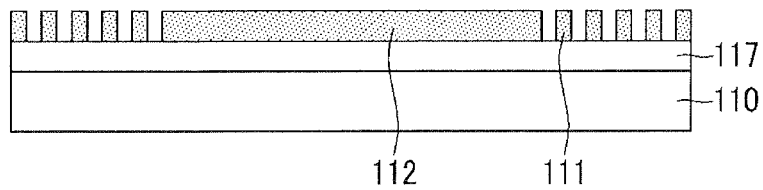

In FIG. 8, the photo resist pattern 111-4' and the hard mask pattern 111-1' are removed to form the metal wires 111 and the light blocking film 112.

Figure 9:
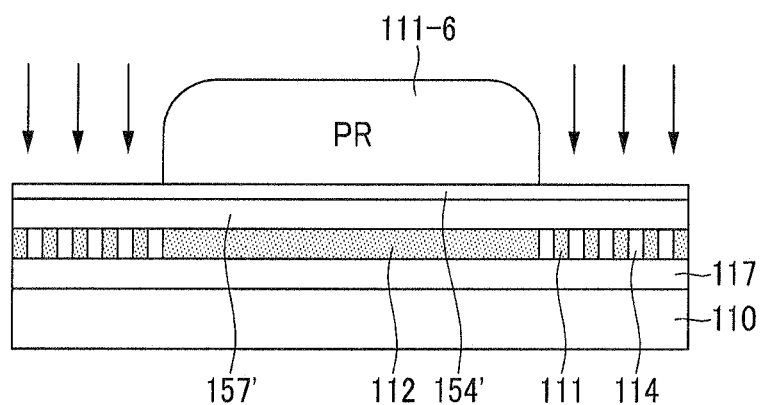

In FIG. 9, a preliminary interlayer buffer layer 157' is formed on a structure resulted from the process step of FIG. 8. A preliminary semiconductor layer 154' is laminated thereon. A photo resist pattern 111-6 is formed on the preliminary semiconductor layer 154' by performing exposure and development processes. In the exposure process, a mask that is substantially the same as that used in forming the photo resist pattern 111-4' of FIG. 6 may be used. For example, the mask 111-5 that is used for forming the photo resist pattern 111-4' of FIG. 6 may be used for forming the photo resist pattern 111-6 of FIG. 9. As a result, the photo resist pattern 111-6 is formed only on the light blocking film 112 of the lower polarizer 11. For example, a perimeter of the photo resist pattern 111-6 is aligned with that of the light blocking film 112. The light blocking film 112 is formed in the reflective area (RA). The photo resist pattern 111-6 is also used as an etch mask to form the semiconductor layer 154 and the interlayer buffer layer 157. For example, the preliminary semiconductor layer 154' may be patterned to form the semiconductor layer 154 by using the photo resist pattern 111-6 as an etch mask. The preliminary interlayer buffer layer 157' may be patterned to form the interlayer buffer layer 157 using the photo resist pattern 111-6 as an etch mask.

Hereinafter, referring to FIGS. 10 and 11, manufacturing steps will be explained to form a thin film transistor on the light blocking film 112. The thin film transistor serves to drive liquid crystals and the light blocking film 112 prevents light from the backlight 500 of FIG. 1 from illuminating the thin film transistor, which will reduce photo currents that light may generate in a semiconductor layer of the thin film transistor. For example, the semiconductor layer may include a silicon layer.

Figure 10:
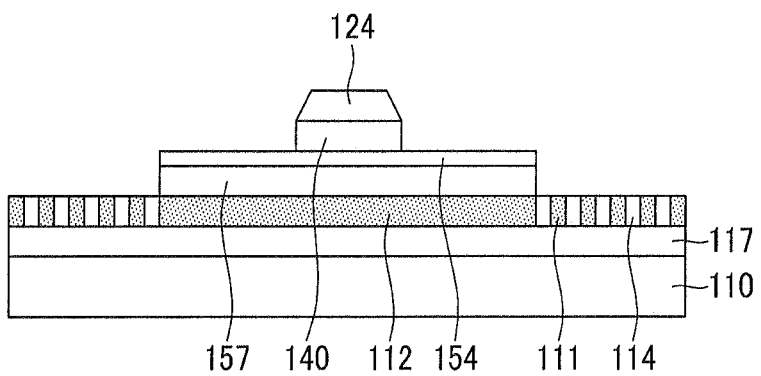

In FIG. 10, a gate electrode 124 and a gate insulating layer 140 are formed on the semiconductor layer 154. For example, a preliminary gate insulating layer (not shown) and a metal layer (not shown) are sequentially deposited on the semiconductor layer 154. A photolithographic process may be applied to form the gate electrode 124 and the gate insulating layer 140.

Figure 11:
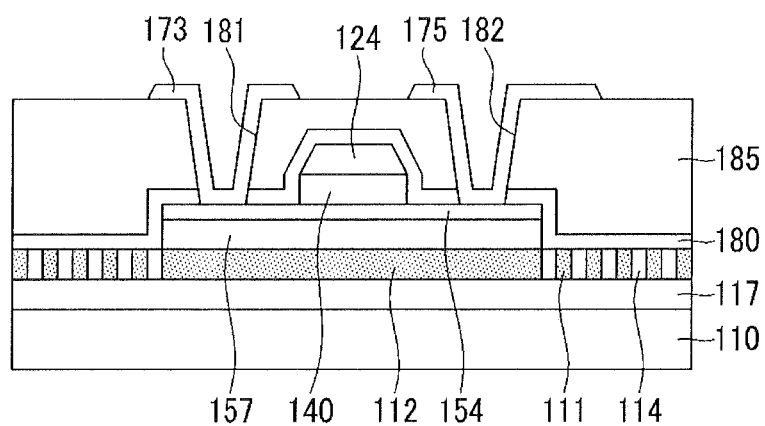

In FIG. 11, a first passivation layer 180 is laminated on the structure resulting from the manufacturing process of FIG. 10, and then a second passivation layer 185 is laminated thereon. For example, the first passivation layer 180 may include an inorganic insulating material and the second passivation layer 185 may include an organic insulating material. A first contact hole 181 and a second contact hole 182 are formed in the first and the second passivation layers 180 and 185 to expose a source region and a drain region of the semiconductor layer 154. A metal layer (not shown) is laminated thereon and is etched to form a source electrode 173 and a drain electrode 175. In forming the first passivation layer 180, the first passivation layer 180 does not fill the gaps 114, thereby forming voids filled with air. Alternatively, a material having a refractive index corresponding to air may fill with the gaps before the first passivation layer 180 is formed.

Next, as illustrated in FIG. 1, a third passivation layer 187 is formed on the structure resulting from the manufacturing process of FIG. 11. The third passivation layer 187 may cover the second passivation layer 185, the source electrode 173 and the drain electrode 175. For example, the third passivation layer 187 may include an inorganic insulating material and/or an organic insulating material. Then, the contract hole 183 is formed in the third passivation layer 187, to expose a part of the drain electrode 175. A pixel electrode 190 is formed on the part of the drain electrode 175 and on the third passivation layer 187. For example, the pixel electrode 190 may include a transparent conductive material such as ITO (indium tin oxide), and/or IZO (indium zinc oxide).

According to exemplary embodiments of the present invention, the semiconductor layer 154 and the light blocking film 112 of the lower polarizer 11 may be formed by using a same mask and as a result, may reduce the number of masks necessary to manufacture a liquid crystal display. Also, since the light blocking film 112 of the lower polarizer 11 blocks light incident from the backlight unit 500 on the semiconductor layer 154, the semiconductor layer 154 does not generate photocurrent arising from the incident light, so that reliability of a display device is increased.

In an exemplary embodiment, an upper polarizer 21 of the upper panel 200 may include metal wires. The metal wires of the upper polarizer 21 may be formed with the substantially same manufacturing process as those as shown in FIGS. 3 and 4. The upper polarizer 21 may include an absorptive polarizer including a TAC (Triacetyl Cellulose) layer and a PVA (polyvinyl alcohol) layer.

While the present inventive concept has been shown and described with reference to exemplary embodiments thereof, it will be apparent to those of ordinary skill in the art that various changes in form and detail may be made therein without departing from the sprit and scope of the inventive concept.

What is claimed is:

1. A liquid crystal display, comprising:
a transparent insulation substrate;
a first polarizer comprising a light blocking film and a first plurality of metal wires, the first polarizer disposed on the transparent insulation substrate;
an interlayer buffer layer disposed on the light blocking film, the interlayer buffer layer having a perimeter aligned with a perimeter of the light blocking film;
a semiconductor layer disposed on the interlayer buffer layer, the semiconductor layer having a perimeter directly aligned with a perimeter of the interlayer buffer layer;
a thin film transistor disposed on the semiconductor layer, wherein the thin film transistor comprises a source region and a drain region; and
a backlight unit disposed under the transparent insulation substrate, the backlight unit providing light to the transparent insulation substrate,
wherein the light blocking film reflects substantially all of the light, and wherein gaps are disposed between the first plurality of metal wires.

2. The liquid crystal display of claim 1, wherein the interlayer buffer layer is disposed between the semiconductor layer and the light blocking film.

3. The liquid crystal display of claim 1, wherein a width of the gaps is less than a wavelength of the light provided by the backlight unit.

4. The liquid crystal display of claim 1, further comprising a first buffer layer disposed between the transparent insulation substrate and the first polarizer.

5. The liquid crystal display of claim 1, wherein the thin film transistor comprises a gate electrode and a gate insulating layer, the gate insulating layer disposed on the semiconductor layer and the gate electrode disposed on the gate insulating layer.

6. The liquid crystal display of claim 5, wherein the source and the drain regions are disposed in the semiconductor layer, and wherein the thin film transistor further comprises a source electrode connected to the source region and a drain electrode connected to the drain region.

7. The liquid crystal display of claim 6, further comprising a pixel electrode connected to the drain electrode of the thin film transistor.

8. The liquid crystal display of claim 1, wherein the light blocking film and the first plurality of metal wires include a common metal including at least one of Al, Au, Ag, Cu, Cr, Fe, and Ni.

9. The liquid crystal display of claim 1, further comprising a second polarizer comprising a second plurality of metal wires, the second plurality of metal wires spaced apart from each other at a predetermined distance smaller than a wavelength of the light from the backlight unit.

10. The liquid crystal display of claim 1, wherein an upper surface of the light blocking film is level with that of the first plurality of metal wires.

11. The liquid crystal display of claim 10, wherein each of the first plurality of metal wires has a predetermined thickness and a predetermined width, the predetermined thickness being at least 2.5 times than the predetermined width.

12. The liquid crystal display of claim 1, wherein the gaps include air.

* * * * *